United States Patent
Ter-Zakhariants et al.

(10) Patent No.: US 11,321,200 B1
(45) Date of Patent: May 3, 2022

(54) HIGH AVAILABILITY AND SOFTWARE UPGRADES IN A VIRTUAL CABLE MODEM TERMINATION SYSTEM

(71) Applicant: Harmonic, Inc., San Jose, CA (US)

(72) Inventors: Andrey Ter-Zakhariants, San Jose, CA (US); Ihor Kopieichyk, Santa Clara, CA (US); Nagesh Nandiraju, Willow Grove, PA (US); Robert Gaydos, Harleysville, PA (US)

(73) Assignee: Harmonic, Inc., San Jose, CA (US)

( * ) Notice: Subject to any disclaimer, the term of this patent is extended or adjusted under 35 U.S.C. 154(b) by 158 days.

(21) Appl. No.: 16/748,124

(22) Filed: Jan. 21, 2020

Related U.S. Application Data

(60) Provisional application No. 62/794,904, filed on Jan. 21, 2019.

(51) Int. Cl.
| | |
|---|---|
| *G06F 11/20* | (2006.01) |
| *H04L 12/28* | (2006.01) |
| *G06F 11/14* | (2006.01) |
| *G06F 8/65* | (2018.01) |

(52) U.S. Cl.
CPC ............ *G06F 11/2025* (2013.01); *G06F 8/65* (2013.01); *G06F 11/1417* (2013.01); *H04L 12/2801* (2013.01); *G06F 2201/805* (2013.01)

(58) Field of Classification Search
CPC .... G06F 11/2025; G06F 11/1417; G06F 8/65; G06F 2201/805; H04L 12/2801
See application file for complete search history.

(56) References Cited

U.S. PATENT DOCUMENTS

| | | | |
|---|---|---|---|
| 6,839,829 B1 * | 1/2005 | Daruwalla | H04L 12/2801 348/E7.07 |
| 10,089,123 B2 * | 10/2018 | Bernstein | H04L 12/4633 |
| 2019/0104027 A1 * | 4/2019 | Evans | H04L 41/145 |
| 2019/0220315 A1 * | 7/2019 | Vallala | G06F 9/45558 |
| 2019/0272331 A1 * | 9/2019 | Gangadhar | G06F 16/214 |
| 2019/0342379 A1 * | 11/2019 | Shukla | G06F 16/2272 |
| 2020/0065086 A1 * | 2/2020 | Woodmansee | G06F 9/5072 |

* cited by examiner

*Primary Examiner* — Bryce P Bonzo
*Assistant Examiner* — Michael Xu
(74) *Attorney, Agent, or Firm* — Brokaw Patent Law PC; Christopher J. Brokaw

(57) ABSTRACT

A Cable Modem Termination System (CMTS) providing high speed data services to one or more remote physical devices (RPDs). The CMTS executes entirely upon a plurality of protection groups. Each of the plurality of protection groups consists of a plurality of pods. A dynamic adjustment may be made as to which pods in a particular protection group are active. The dynamic adjustment is made response to determining that a particular protection group is experiencing a failure. This determination may be made by a high availability agent executing within a pod, of the particular protection group, that is experiencing the failure. Software associated with supporting a particular service group of the CMTS may be upgraded without upgrading the software associated with supporting the remainder of the plurality of service groups serviced by the CMTS.

24 Claims, 19 Drawing Sheets

US 11,321,200 B1

HIGH AVAILABILITY AND SOFTWARE UPGRADES IN A VIRTUAL CABLE MODEM TERMINATION SYSTEM

CLAIM OF PRIORITY

The present application claims priority to U.S. Provisional Patent Application No. 62/794,904, entitled "High Availability and Software Upgrades in a Virtual Cable Modem Termination System," filed Jan. 21, 2019, the disclosure of which is hereby incorporated by reference for all purposes in its entirety as if fully set forth herein.

The present application is related to U.S. Pat. No. 10,020,962, granted Jul. 10, 2018, for "Virtual Converged Cable Access Platform (CCAP) Core, the disclosure of which is hereby incorporated by reference for all purposes in its entirety as if fully set forth herein.

FIELD OF THE INVENTION

Embodiments of the invention generally relate to ensuring the high availability of a Cable Modem Termination System.

BACKGROUND

Converged Cable Access Platform (CCAP) is a standard, proposed and administered by CableLabs of Sunnyvale, Calif., for an architecture employed by a cable operator. CableLabs has publicly issued a Remote PHY family of specifications, known as the MHAv2 specifications (Modular Headend Architecture version 2). These specifications describe how a CCAP platform may be separated into two components, (1) a CCAP Core located at a cable headend, and (2) a Remote PHY device (RPD), which is typically located outdoors. A RPD may be located, for example, at the junction of the fiber and coax plants in an optical node serving as a Remote PHY Node (RPN). A CCAP core can control and setup data paths with multiple RPDs situated in multiple fiber nodes. FIG. 17 is a block diagram of a CCAP platform which includes an RPD situated inside an RPN in accordance with the MHAv2 specifications of the prior art.

The motivation behind CCAP is to lower the operating costs of cable operators via a single platform which can offer traditional video and broadband services to their consumers. CCAP is a managed architecture as it leverages existing cable technologies and makes provisions for new ones that may arise. As a result, cable operators may take many different paths towards conforming to the CCAP standard, and thereafter, may continue to evolve their architecture in many different ways post-compliance to CCAP. The functions of a CCAP platform include but are not limited to those performed by a Cable Modem Termination System (CMTS). A CMTS, as is well-known in the industry, is a term that refers to equipment for providing high speed data services to cable subscribers.

A typical approach taken to ensure the high-availability of a CMTS involves the use of implementing the CMTS using redundant hardware entities (such as redundant cards in a chassis or redundant servers in a cluster), with one of the hardware entities acting as a backup to the other active hardware entities. When a failure is detected or encountered in any software component executing upon an active hardware entity, then that hardware entity is considered failed and active software operations failover to the backup hardware entity. The failed hardware entity is typically rebooted to render it operational once more.

If anything goes wrong in the failover process, the entire workload for all cable subscribers handled by the failed hardware entity will experience a service outage. Since a single card in a chassis, or a single server in a cluster, typically handles thousands of subscribers, a failure in a software component that results in an entire hardware entity failing can result in a significant outage for the affected cable customers.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
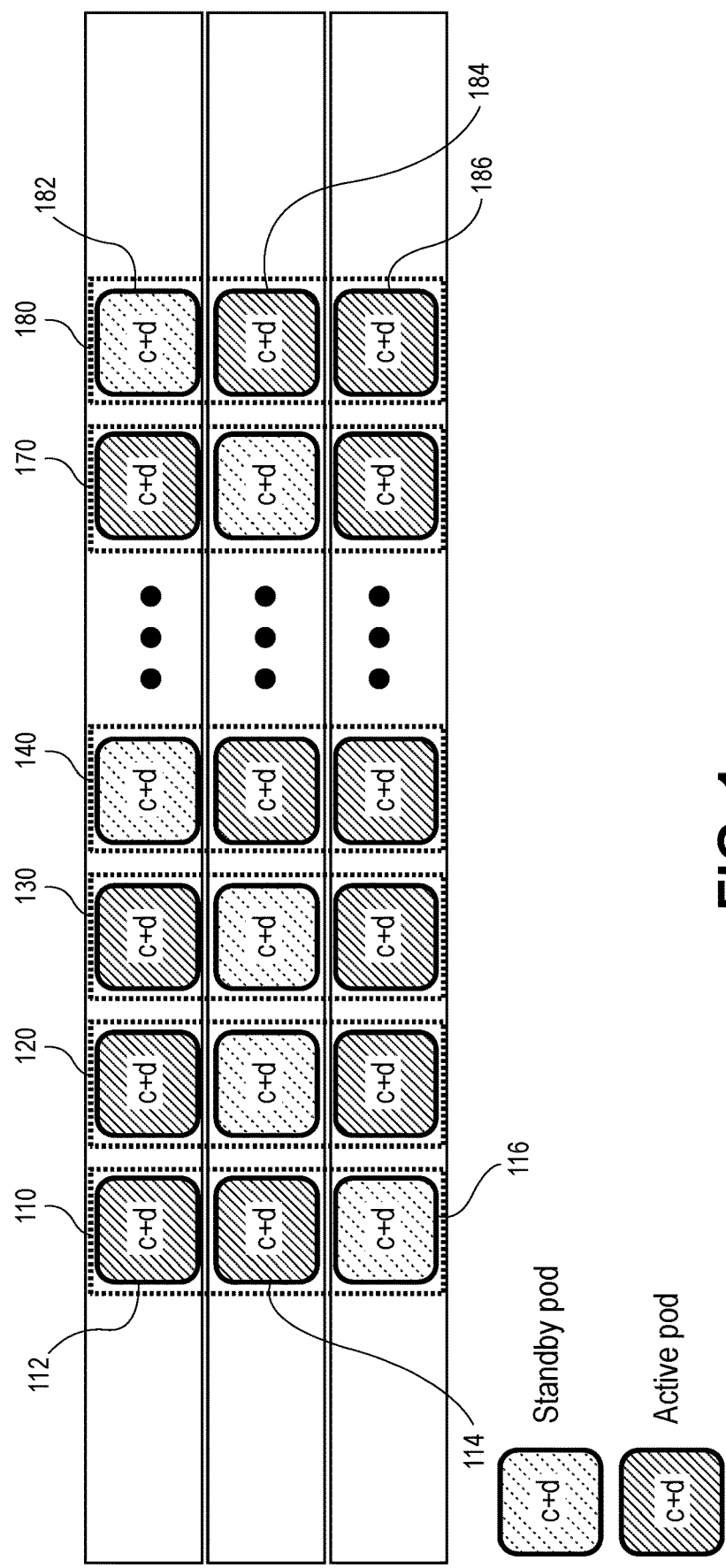
FIG. 1 is an illustration of a plurality of protection groups in accordance with an embodiment of the invention.

Approaches for ensuring the high availability of a Cable Modem Termination System (CMTS) are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Ensuring High Availability in a Software Architecture

Embodiments of the invention are directed towards distributing the workload and software resources of a software platform or entity, such as but not limited to a CMTS, amongst a plurality of separate entities called protection groups, which themselves are composed of separate entities called pods. Failures are managed at the level of an individual pod so that when a failure is detected in any process or microservice executing within a particular pod, only the particular pod experiencing the failure is required to failover. In this way, all the other pods (including those pods executing on the physical server as the failed pod) may continue to operate as normal.

Each pod is responsible for handling a particularly sized workload, such as the work required to provide a service to a Data Over Cable Service Interface Specification (DOCSIS) service group. As a result, the failure domain of any single pod is small, and any problems encountered during a failover process of a single pod can only affect cable subscribers handled by that failed pod.

A failed pod may be recovered quickly since the failed pod may be immediately restarted without requiring any reboots or long re-initialization process, either for the pod itself or the server upon which that pod executes. In an embodiment, Kubernetes or another container-orchestration system may be responsible for restarting a failed pod. In other embodiments, specifically manufactured processes or applications may perform this functionality. As a result, embodiments may employ a variety of different mechanisms for managing the operations of pods within a protection group.

Pods and Protection Groups

A pod refers to a collection of related software processes executing within a software container. Each pod comprises all the functionality needed to service the workload assigned to the pod. As a non-limiting, illustrative example, a pod may perform a set of responsibilities for a CMTS service group. Each pod is identical, and so one pod may assume the responsibilities of another pod without issue.

A pod may be implemented using several mechanisms, including but not limited to a virtual machine or any bounded execution environment. Each pod may itself comprise one or more software containers to form a cohesive unit of service from the software processed contained within the pod.

The pods are grouped into units of availability called Protection Groups (PGs). Each PG consists of at least one pod acting as the standby to the other pods (usually 2-3 but may be any number) in the PG that provide active service. Each active pod may handle 1-8 service groups (each service group is an RPD, or the service domain served by a single downstream port of a PHY shelf). Thus, if a deployment serves 250 RPDs, each active pod may serve 1-8 RPDs, and if each protection group has 2 active pods and 1 standby (2:1 HA), then the standby pod in each protection group will backup the state of 2-16 RPDs.

In an embodiment, a protection group may be designed to provide a particular type of service to a group of users. A set of users may be obligated to receive a set of features and/or a specified level of quality and/or a specified level of bandwidth in the cable service. A PG may be designed to operate to provide a particular type of service, such as feature set, level of quality (QoS), and/or bandwidth, to a set of users.

In an embodiment, each PG may be designed to operate to provide service to a particular number of users such that the number of users chosen limits the failure domain (i.e., the number of users experiencing a failure).

In an embodiment, each PG may provide service to a particular geographical area, neighborhood, and/or a set of RPDs.

FIG. 1 is an illustration of a plurality of protection groups in accordance with an embodiment of the invention. FIG. 1 depicts protection groups 110, 120, 130, 140, 170, and 180. Each of the illustrative protections groups in FIG. 1 consists of one standby pod and two active pods. For example, protection group 110 comprises active pods 112, 114 and standby pod 116. As another example, protection group 180 comprises active pods 184, 186 and standby pod 182.

If any active pod fails, the standby pod in its protection group will immediately take over and prevent any outage. If the standby fails to take over, service degradation will be limited to the 1-8 RPDs served by the failed pod, and service will be restored quickly when the failed pod is restarted.

Figure 2:
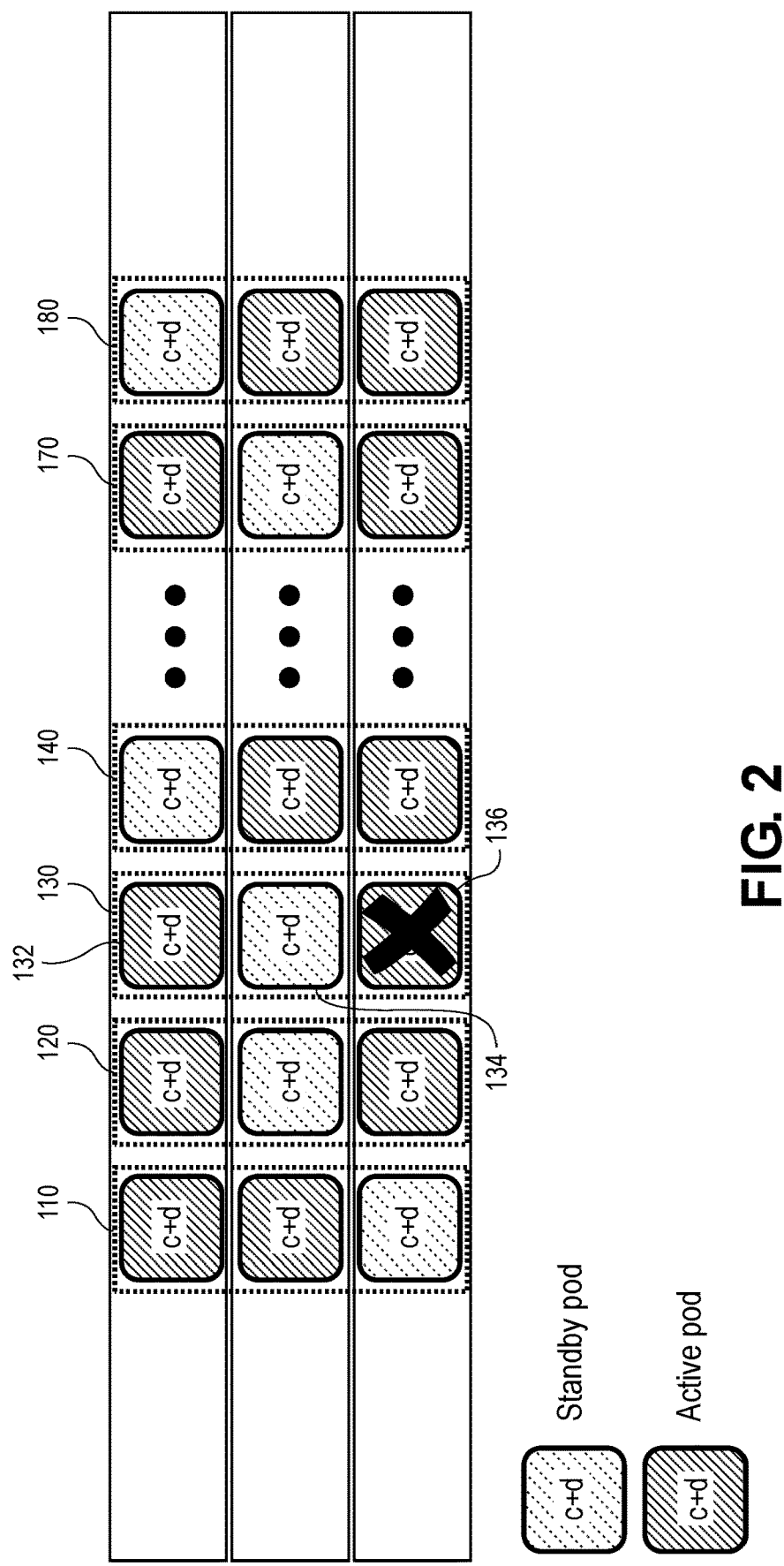
FIG. 2 is an illustration of a plurality of protection groups comprising a failed pod in accordance with an embodiment of the invention.

To illustrate, consider FIG. 2, which is an illustration of a plurality of protection groups experiencing a failure in one pod in accordance with an embodiment of the invention. As shown in FIG. 2, protection group 130 comprises active pods 132, 136 and standby pod 134. In the example of FIG. 2, assume that active pod 136 experiences a failure. In response, standby pod 134 may take over for failed pod 136 in protection group 130.

Server Failure

Figure 3:
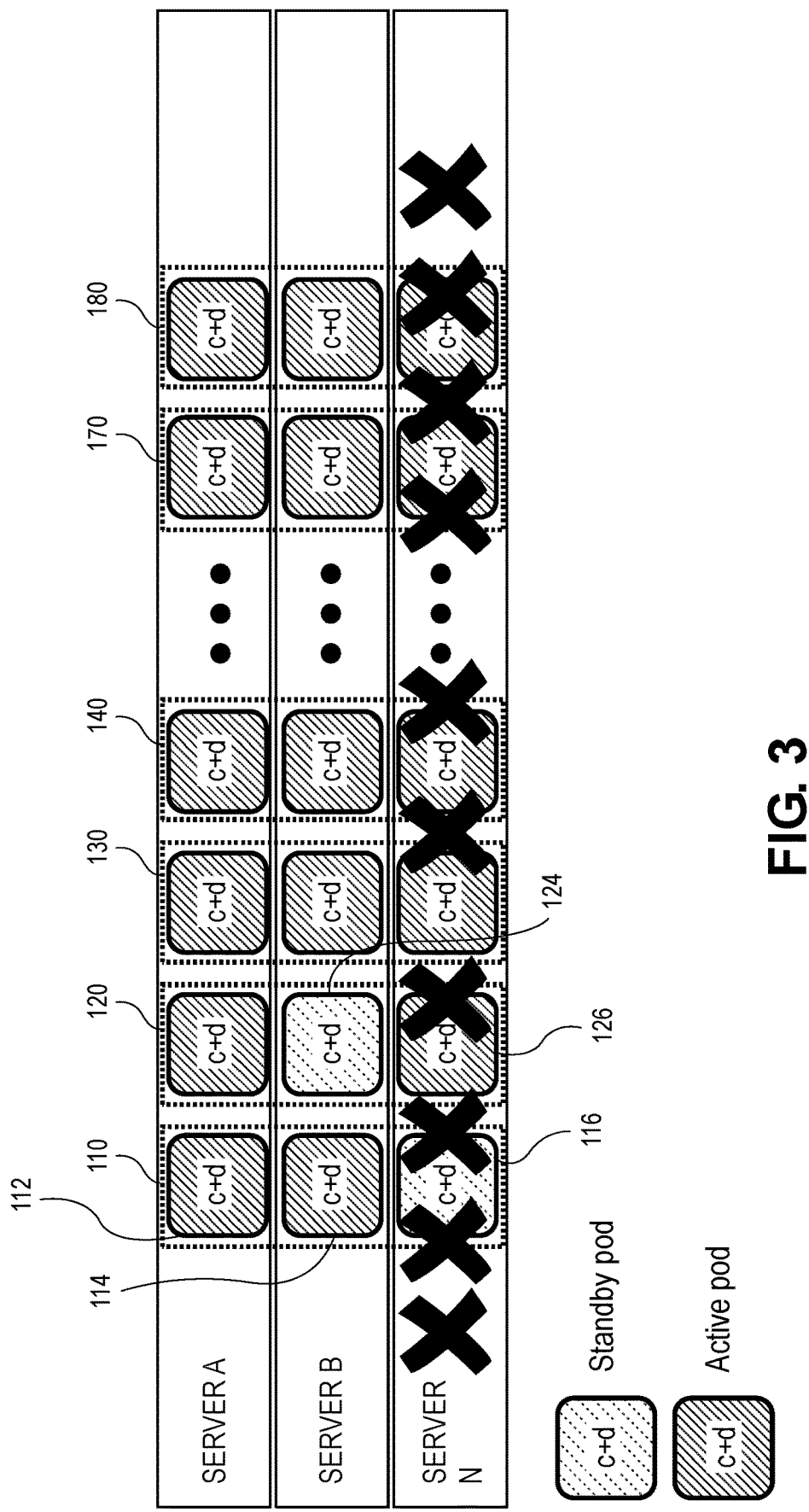
FIG. 3 is an illustration of a plurality of protection groups having pods executing on multiple servers in accordance with an embodiment of the invention.

Each pod of a protection group executes upon on a separate server. To illustrate this principle, consider FIG. 3, which is an illustration of a plurality of protection groups in accordance with an embodiment of the invention. As shown in FIG. 3, each pod within a protection group executes on exactly one of server A, server B, and server N. While FIG. 3 depicts three servers, embodiments may employ any number of servers so long as each pod of a protection group executes upon a different server.

In an embodiment, each pod of a protection group executes upon on a separate physical server. In another embodiment, a portion of the separate servers upon which each protection group executes may be a virtual server.

Since no two pods in a protection group execute on the same server, if when one server upon which the protection group executes fails, then the service provided by the protection group will not fail, as other pods within that protection group remain operational. In the example of FIG. 3, assume that server N fails. Notice that all pods executing on server N correspondingly fail, e.g., pods 116 and 126 fail. As a result of server N experiencing the failure, any active pods on that server fail over to the standby pods in their corresponding protection group. Advantageously, such standby pods are guaranteed to be on another server. For example, standby pod 124 can take over for failed pod 126 as standby pod 124 executes on server B, and server B is still operational. Of course, any standby pod that was executing on a server that fails will not affect service.

Figure 4:
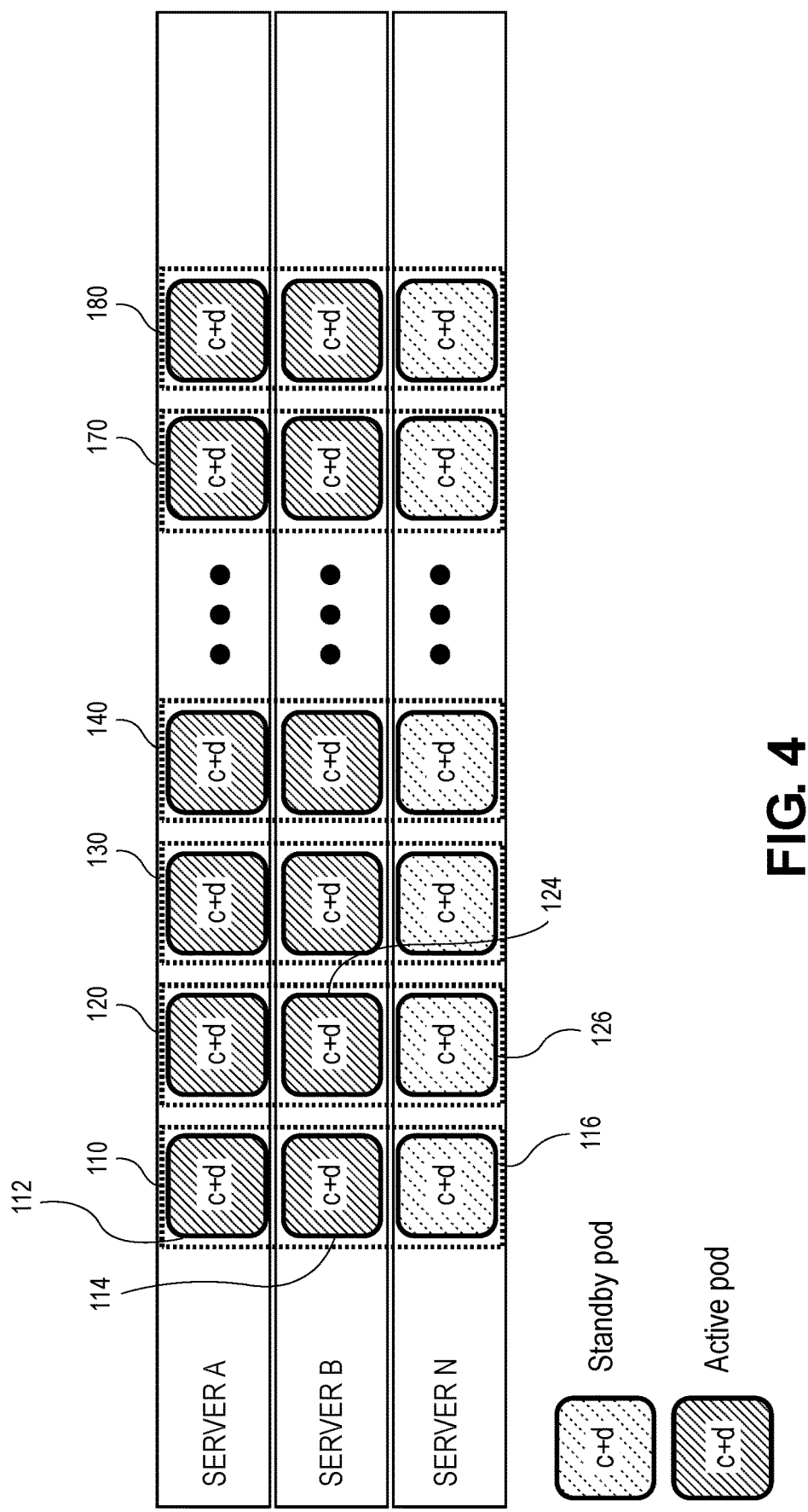
FIG. 4 is an illustration of a plurality of protection groups having standby pods on a restarted server in accordance with an embodiment of the invention.

Once a server experiences failure, the server may be restarted and any pods executing on that server will be subsequently restarted as standby pods. For example, assume that server N in FIG. 3 experiences a failure and is restarted. FIG. 4 is an illustration of the result of restarting failed server N in accordance of an embodiment of the invention. As shown in FIG. 4, each pod executing on server N will resume as a standby pod.

Identifying a Failure

Embodiments allow for dynamically adjusting which pods in a particular protection group are active. As discussed, the dynamic adjustment of which pods in a PG are active may be made in response to detecting that an active pod has experienced a failure. To detect that a pod has experienced a failure, in an embodiment, a high availability (HA) agent monitors each pod of each protection group. The HA agent may be implemented by a process or set of processes that acts as a functional unit for purposes of detecting when any entity, such as a software process or a container, within the pod becomes nonresponsive. The HA agent of an embodiment is implemented to help minimize response time.

When a HA agent detects that any monitored entity within a pod has been nonresponsive, the HA agent provides notification to a hardware or software entity that is responsible for handling pod failure that the pod has failed. Upon received such notification from the HA agent, the pod is deemed to be failed, and appropriate action may be taken.

Software Upgrades

A prior art CMTS software release is monolithic set of software which must be validated over multi-month test cycles. Even after validation, deployment in the production environment of a prior art CMTS typically results in many bugs and issues that were not found during testing, which causes the upgrade process to the stressful and more costly than anticipated. Additionally, deployment in the production environment introduces the possibility that undiscovered bugs and issues may cause unanticipated outages and failures.

Embodiments of the invention greatly simplify the test and upgrade cycle, allowing new features to be deployed to production in minimal time. A small subset of PG services a selected set of service groups in a production deployment can be chosen as the "canary" to test an upgrade on, and just the software associated with that small subset of PGs (i.e., the "canary") can be upgraded. This allows the upgrade to be validated in production without affecting the entire deployment. Once the upgrade is validated on this canary subset, the upgrade can be rolled out to the rest of the deployment with a simple command.

Upgrades may be done in-service with zero downtime during the upgrade process. This is achieved by leveraging high availability of the protection groups, and first upgrading just the standby pods in the set of protection groups that have been chosen to be upgraded.

Figure 5:
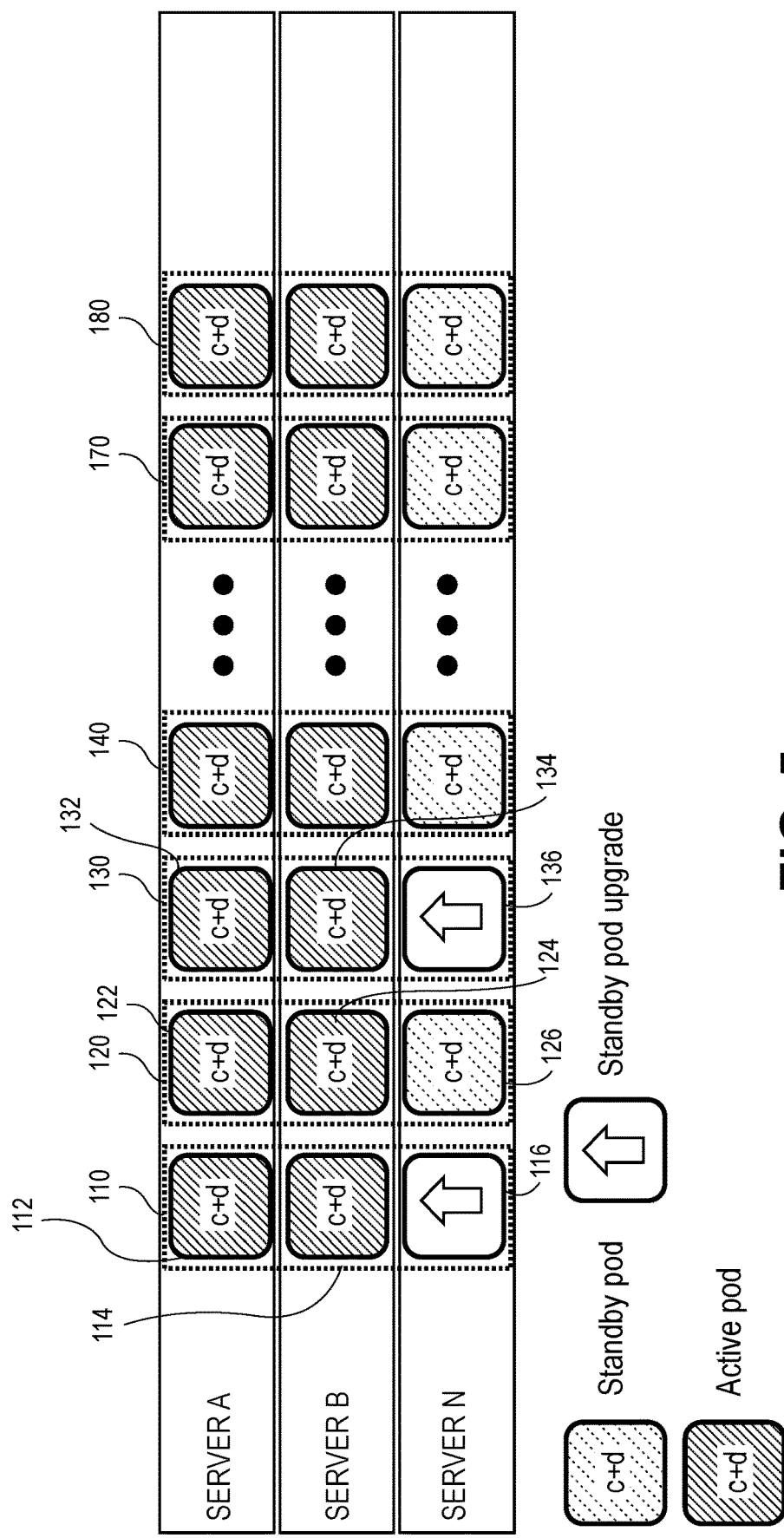
FIGS. 5-9 are illustrations of a plurality of protection groups undergoing an upgrade in accordance with embodiments of the invention.

FIGS. 5-9 are illustrations of a plurality of protection groups undergoing an upgrade in accordance with an embodiment of the invention. Assuming that protection groups 110 and 130 are designated as canary group. As shown in FIG. 5, to perform a software update or a hardware update on a canary protection group, the update is initially performed upon a standby pod for that protection group. In FIG. 5, only standby pod 116 in protection group 110 and standby pod 136 in protection group 130 are being upgraded.

Figure 6:
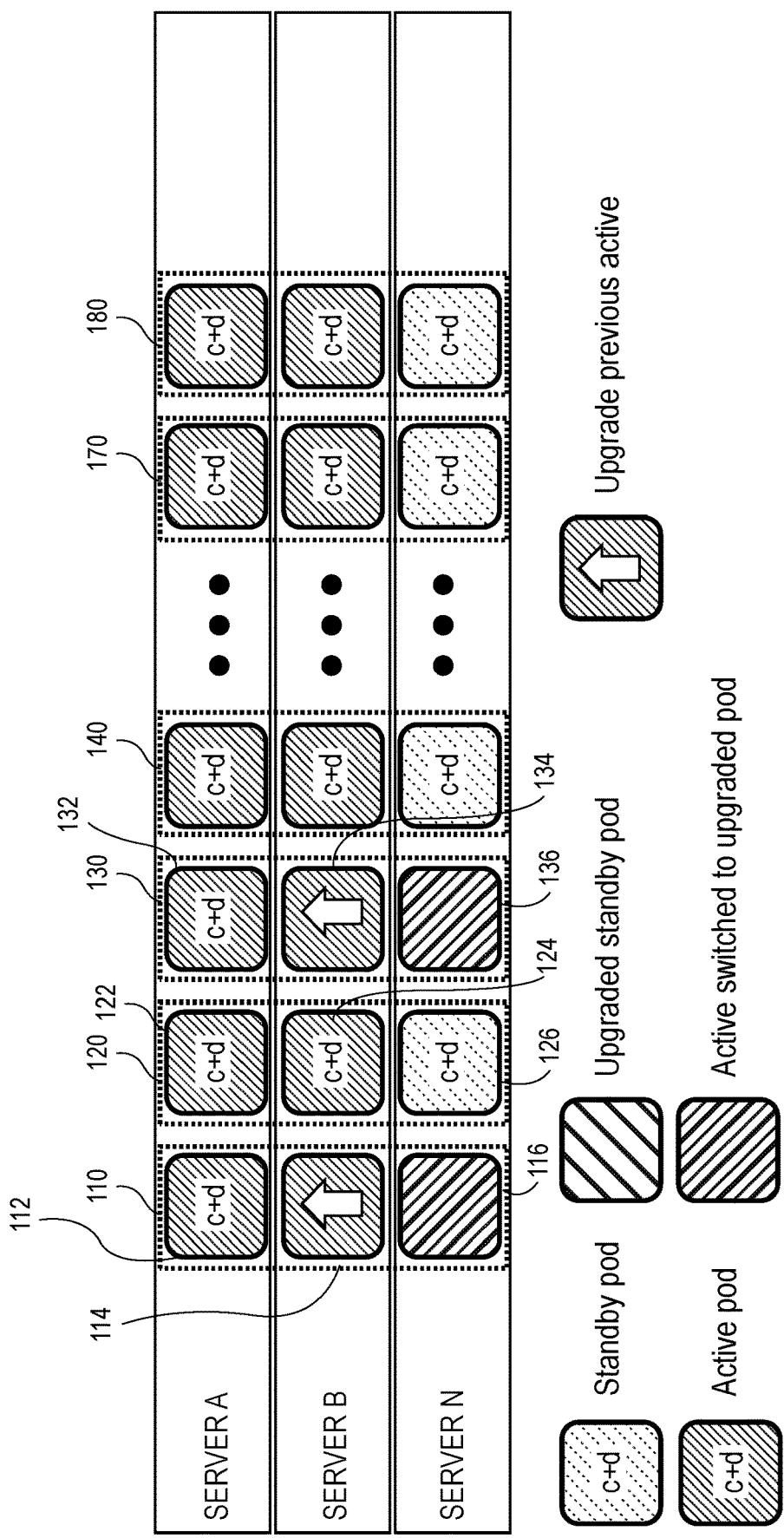

As shown in FIG. 6, once the upgrade to pod 116 and pod 136 is complete, pod 116 and pod 136 both become active. Pod 114 is deemed a standby pod for protection group 110 and pod 134 is deemed a standby pod for protection group 130. Newly designated standby pods 114 and 124 now undergo the upgrade process.

Figure 7:
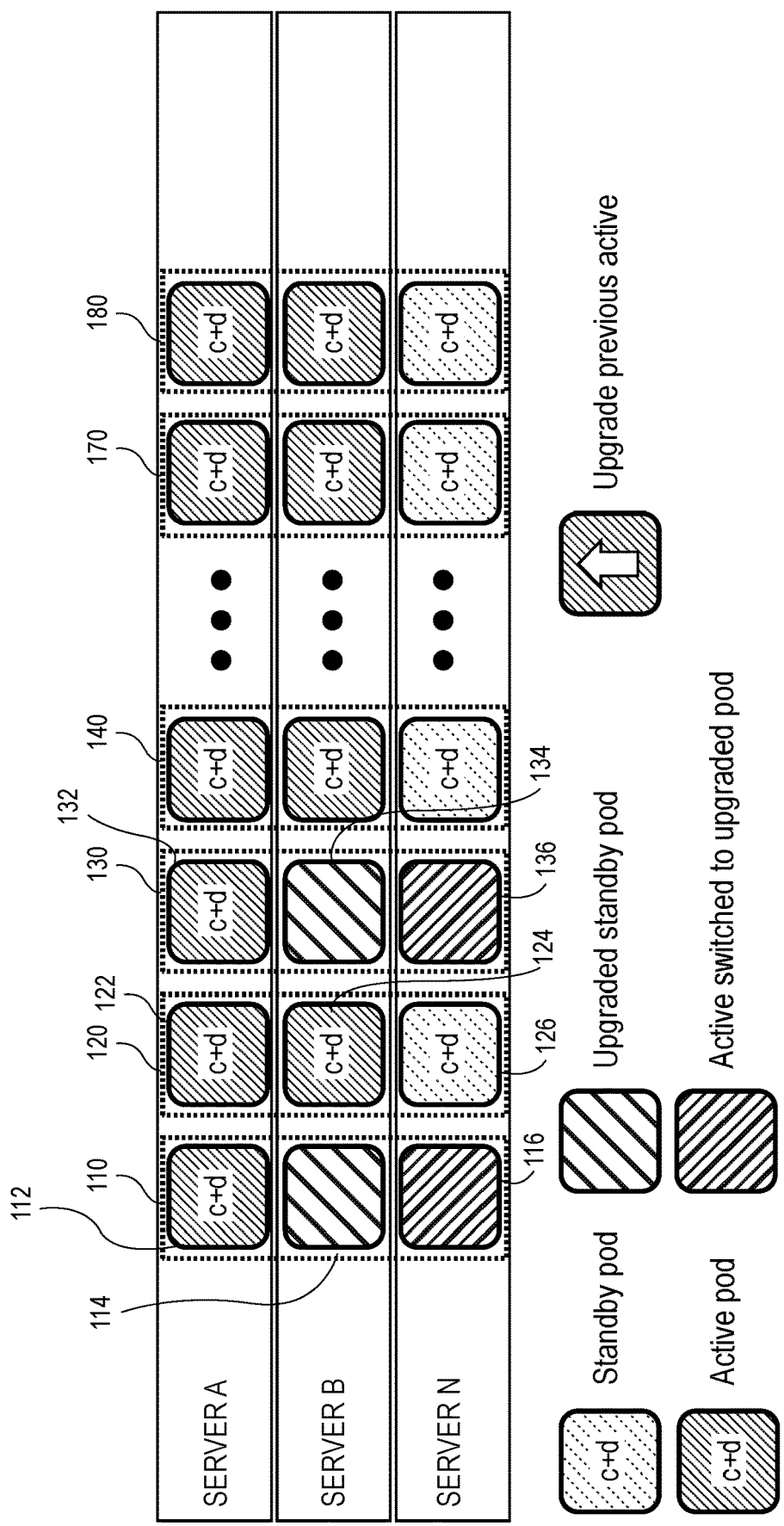
Figure 8:
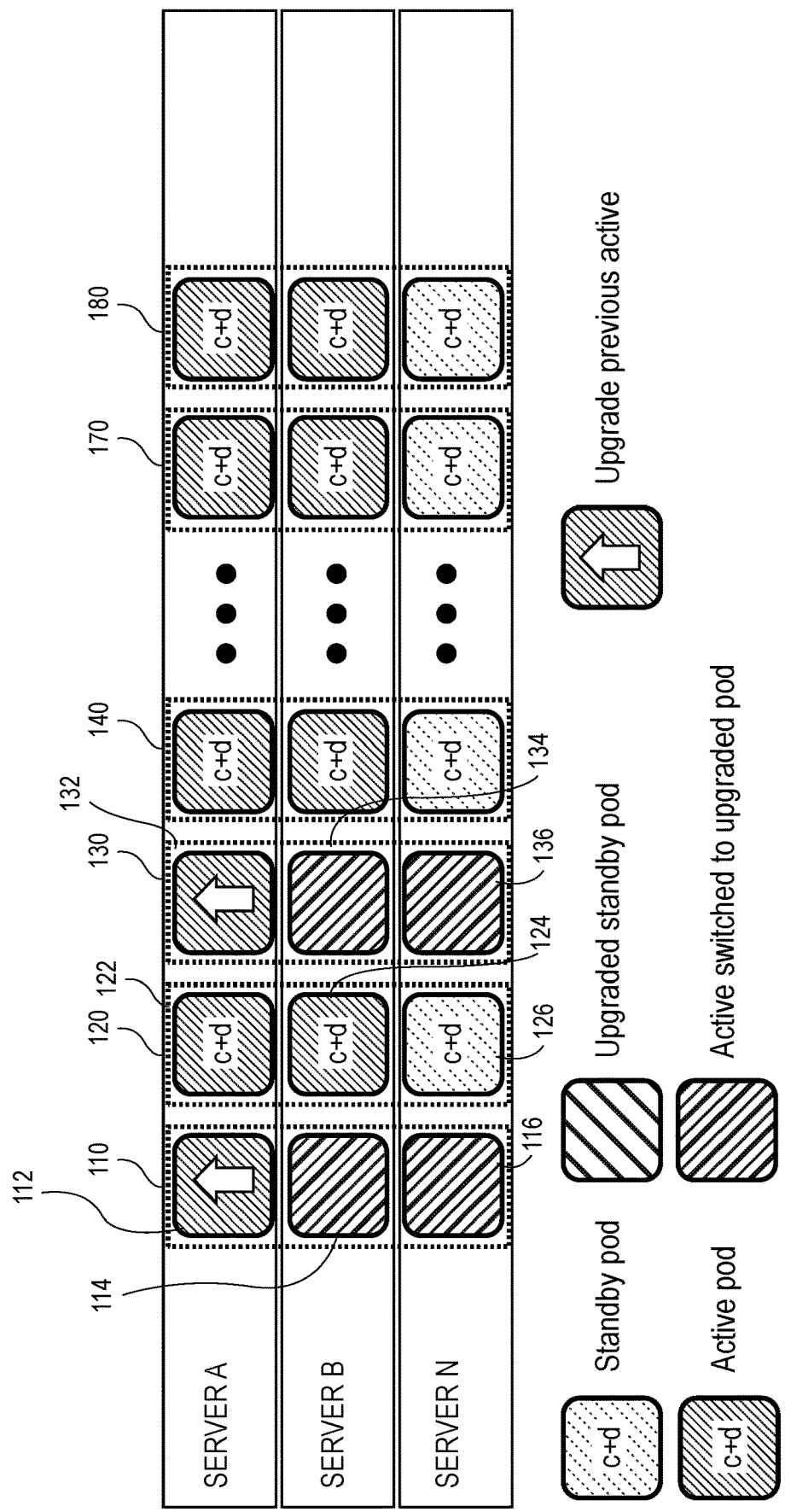

As shown in FIG. 7, newly updated pods 114 and 134 are then designated as a standby pod for protection groups 110 and 130 respectively. As shown in FIG. 8, pods 112 and 132 are designed as standby pods and are subsequently upgraded.

Figure 9:
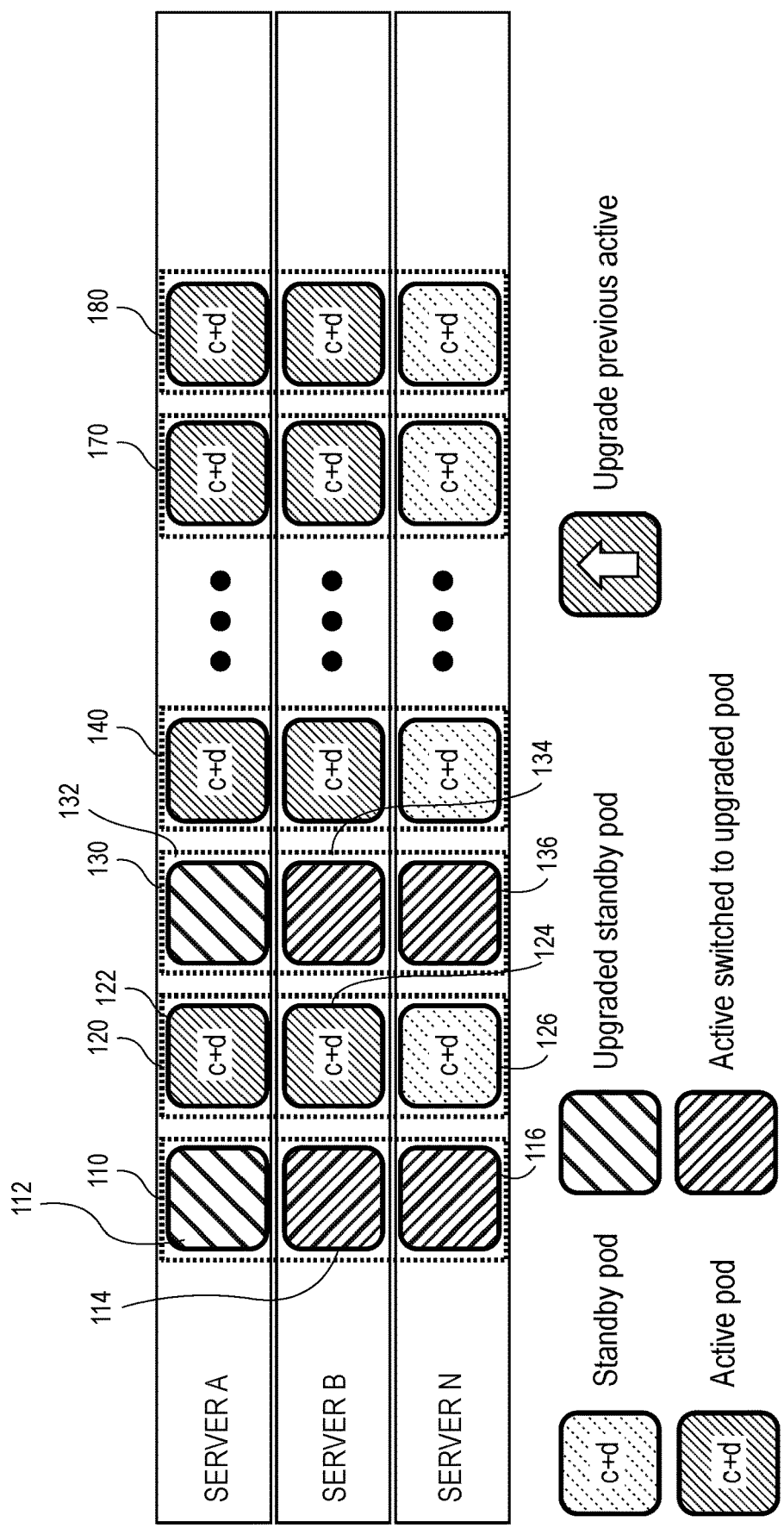

As shown in FIG. 9, this process is repeated until all the pods in the protection group are upgraded. The last pod in a protection group to be upgraded then becomes the standby pod for that protection group. Note that only the selected subset of protection groups (i.e., the canary groups corresponding to protection groups 110 and 130) have been upgraded. All the other protection groups (namely PGs 120, 140, 170, and 180) have not been upgraded. The upgrade can be rolled out to all these protection groups once it has been validated on the canary groups.

Canary Service Group Split-Out

Embodiments of the invention enable just a single service group to be upgraded rather than upgrading a whole protection group. FIGS. 10-16 are illustrations of a plurality of protection groups which will be referenced in explaining a canary service group split-out in accordance with an embodiment of the invention.

Figure 10:
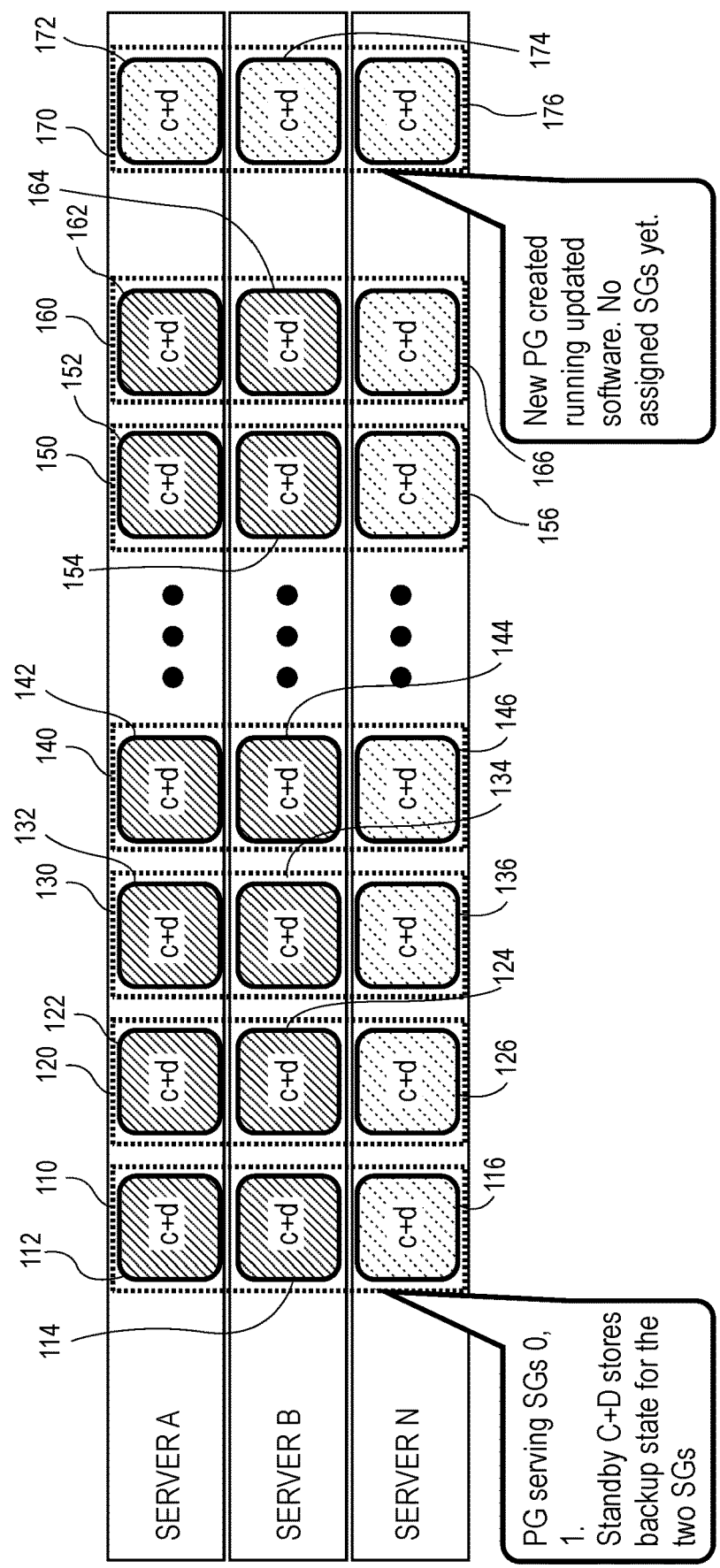
FIGS. 10-16 are illustrations of a plurality of protection groups which will be referenced in explaining a canary service group split-out in accordance with an embodiment of the invention.

As shown in FIG. 10, protection group 110 services two service groups, termed 0 and 1. Protection group 170 is created with upgraded software. No service groups are assigned to protection group 170 at this time.

Figure 11:
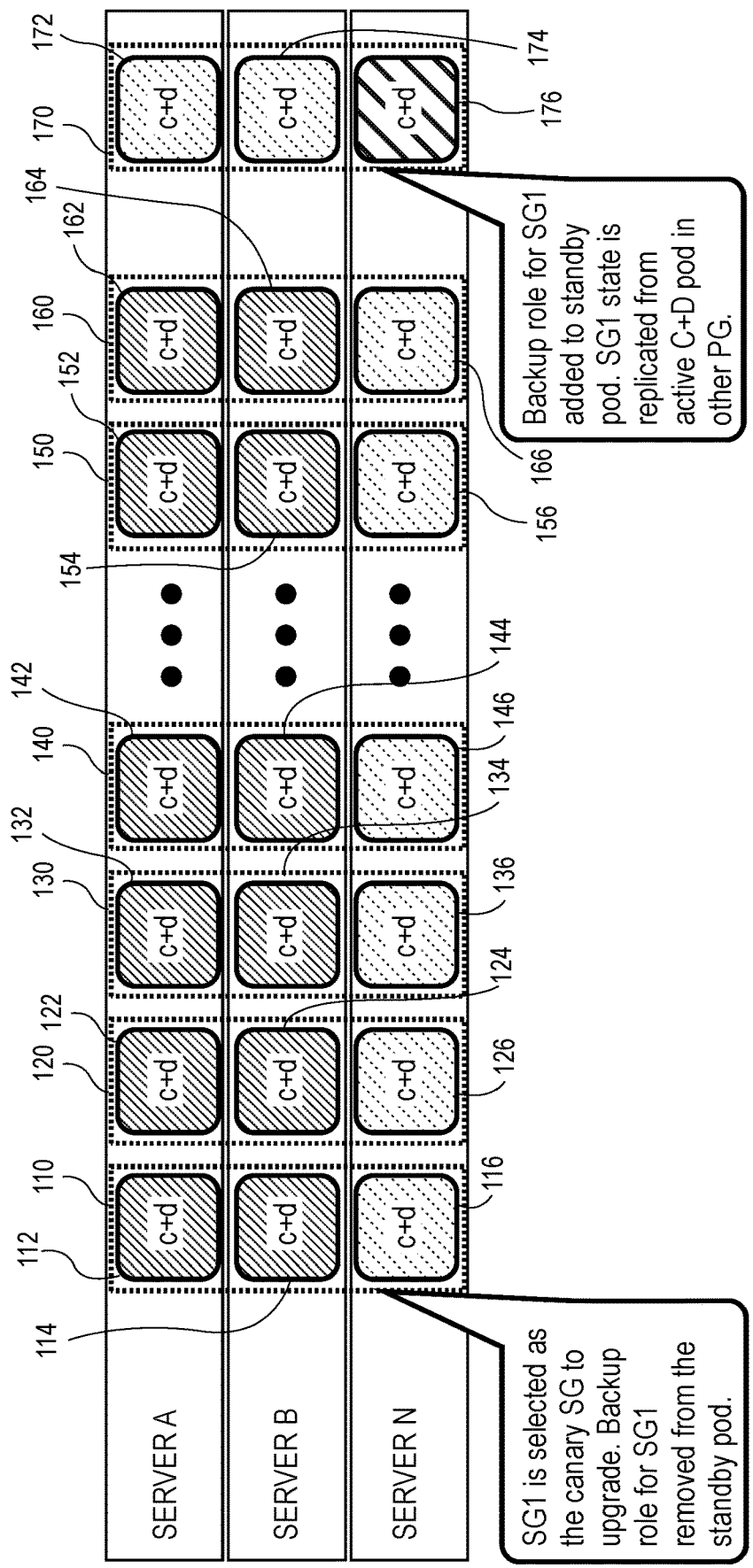

As shown in FIG. 11, service group 1 is selected as the canary service group and is split out of its existing protection group (i.e., protection group 110) into a new protection group (i.e., protection group 170). Note that the canary service group is replicated to a single pod 176 that is designated as standby in protection group 170.

Figure 12:
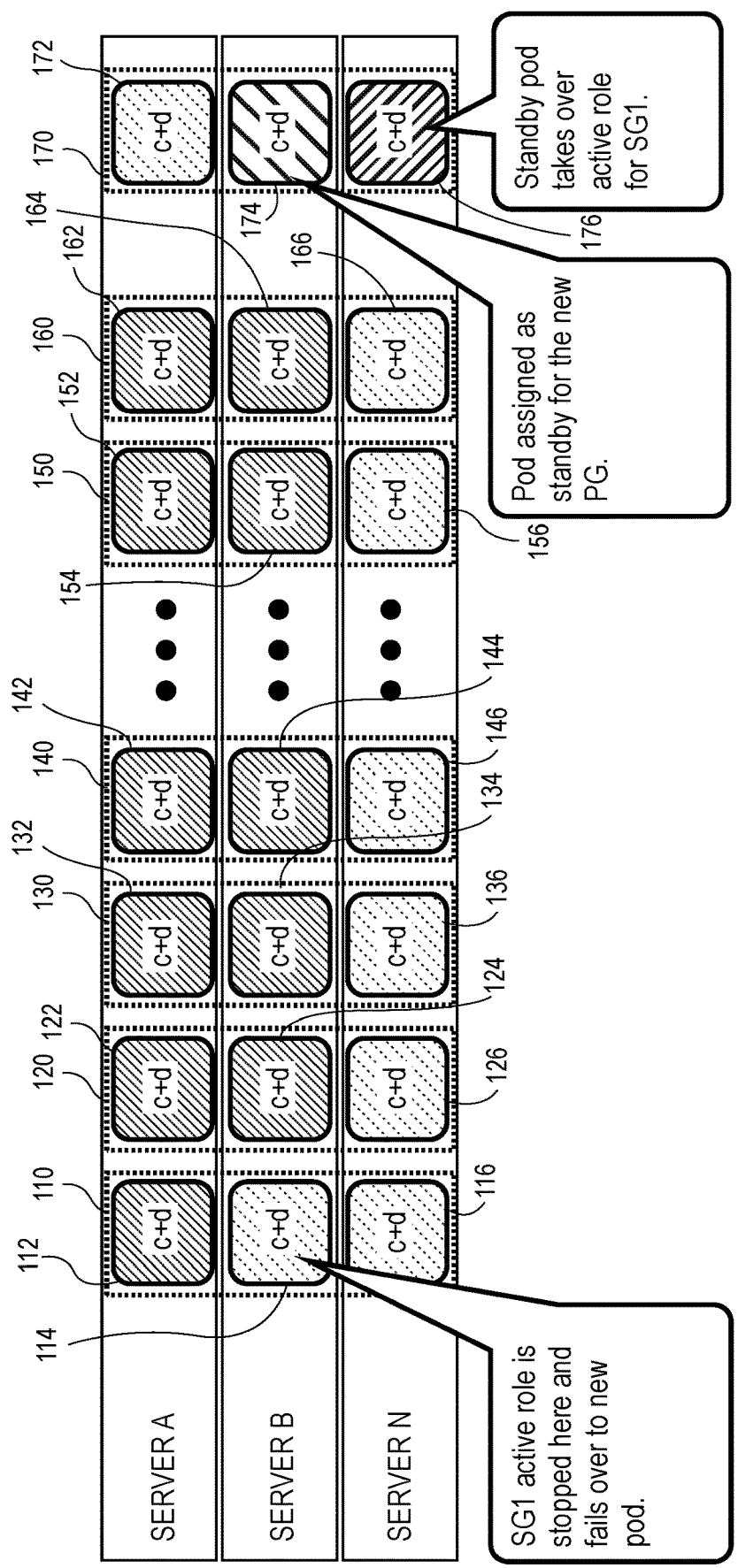

As shown in FIG. 12, canary service group 1 is then failed over to pod 176 in protection group 170. Pod 174 in protection group 170 is then assigned as the new standby pod for the canary service group (service group 1). At this point, the canary service group is running in new protection group 170 with the updated software.

Figure 13:
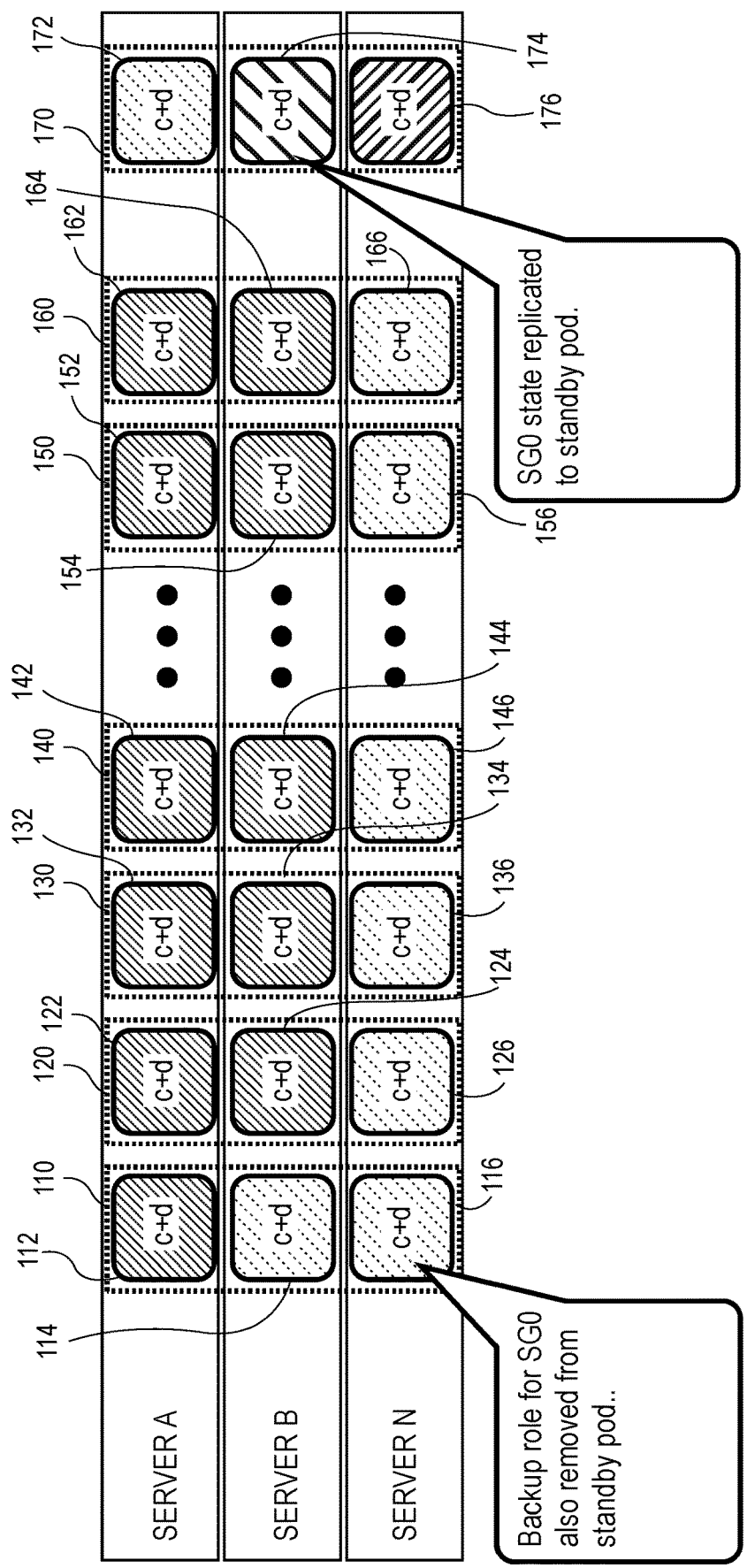
Figure 14:
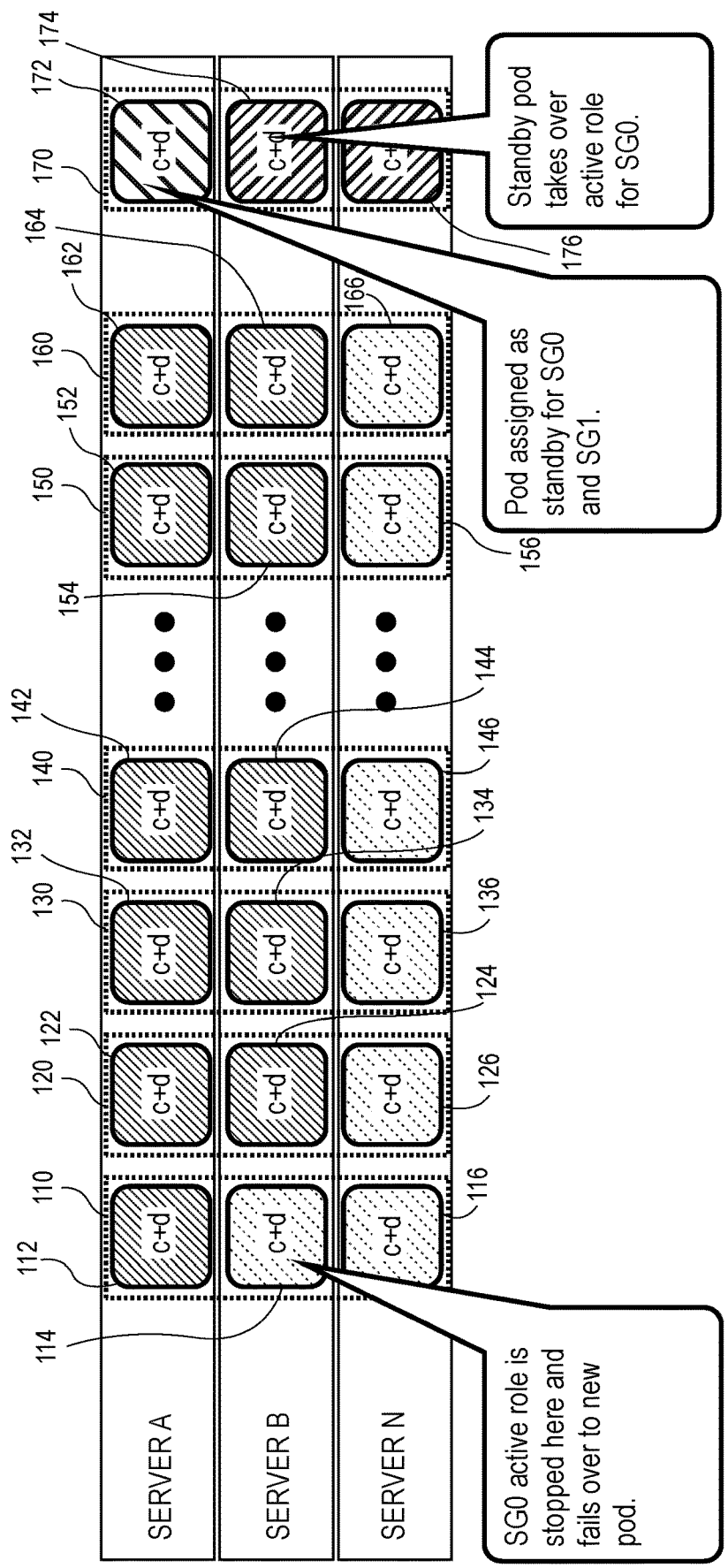

The user can now verify proper operation of the updated software on the canary service group. Once the updated software is deemed to operate as intended and approved by the user, the upgrade can be rolled out to the other service groups in protection group 170 following the same process as before, as shown in FIGS. 13 and 14.

Figure 15:
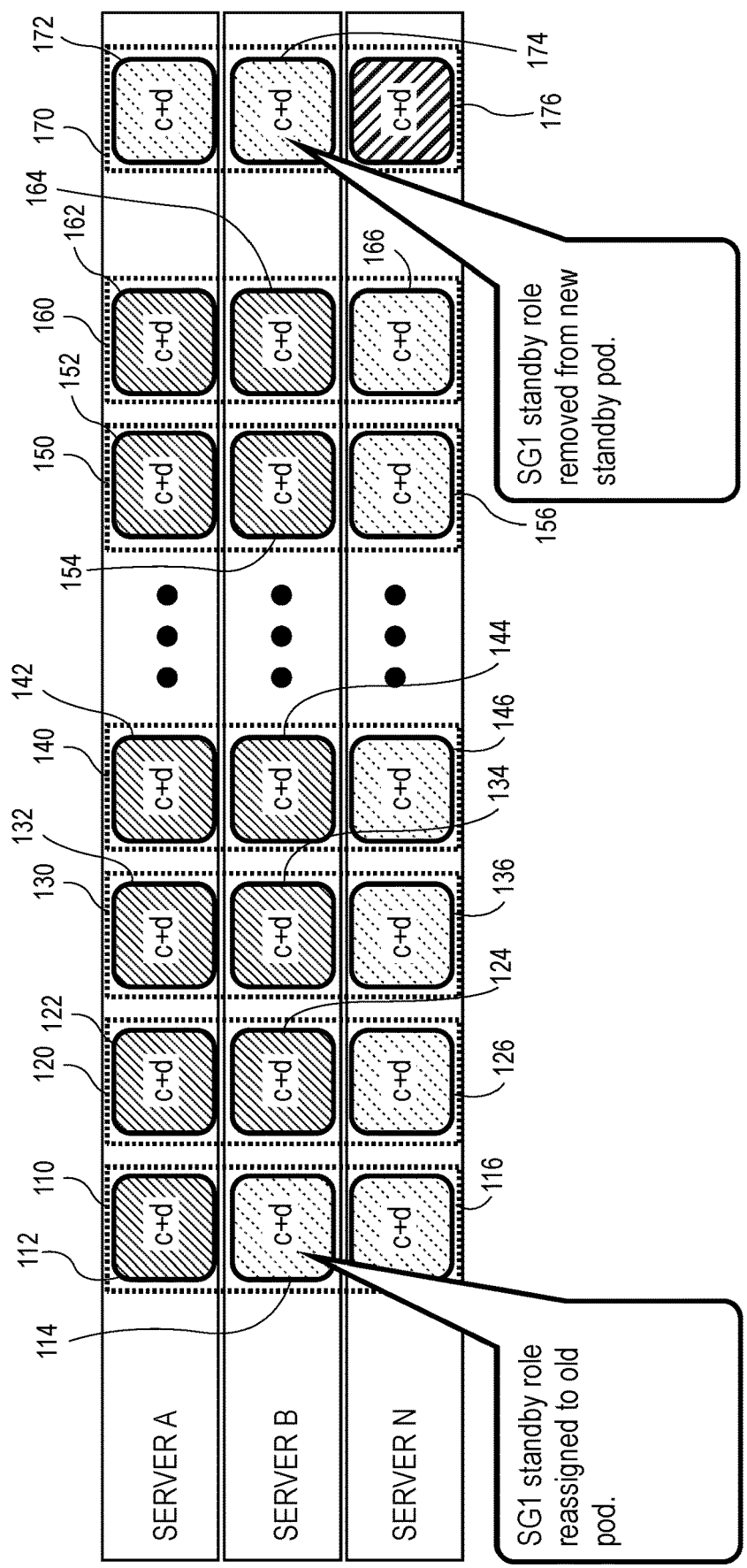
Figure 16:
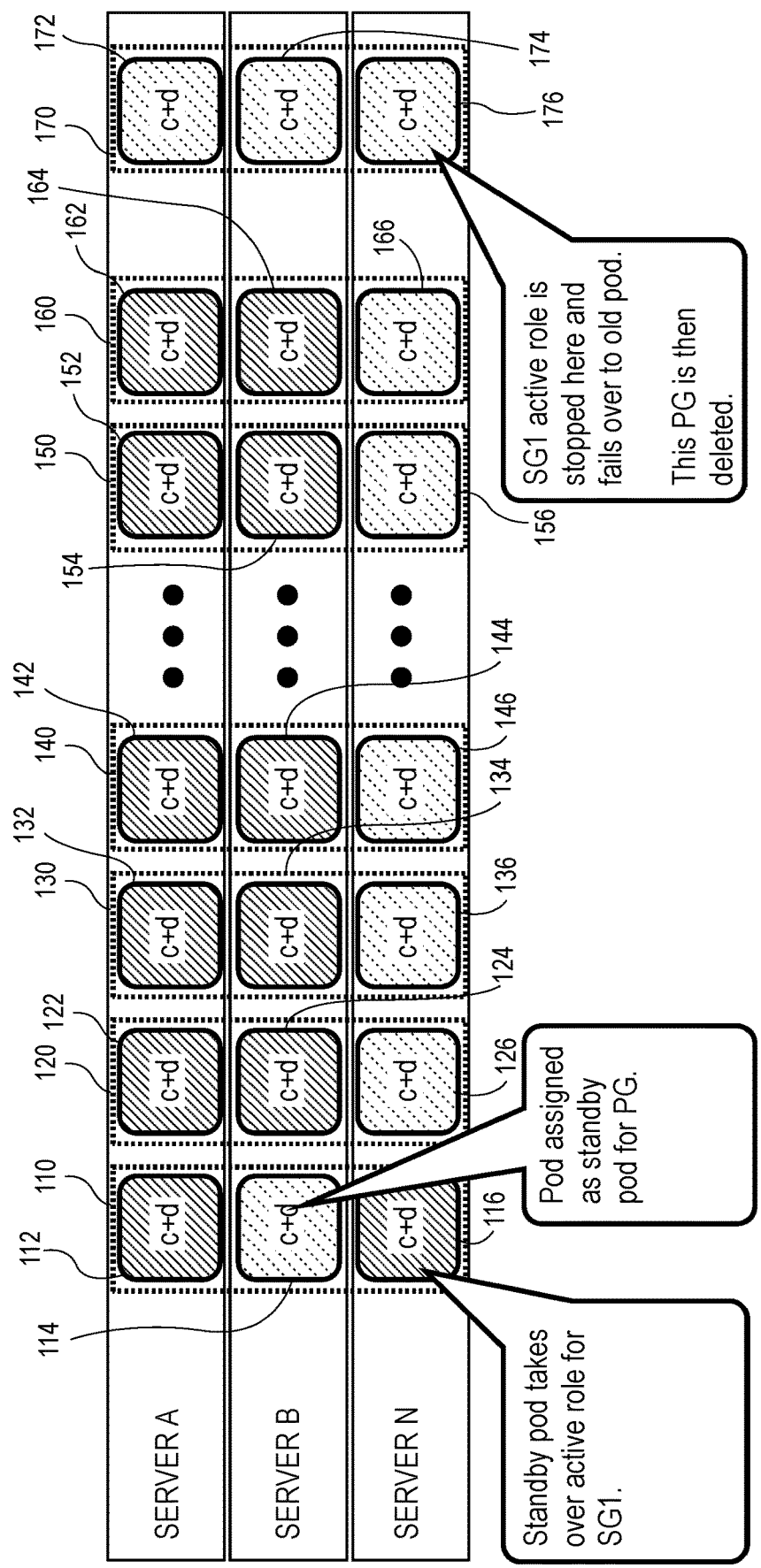
Figure 17:
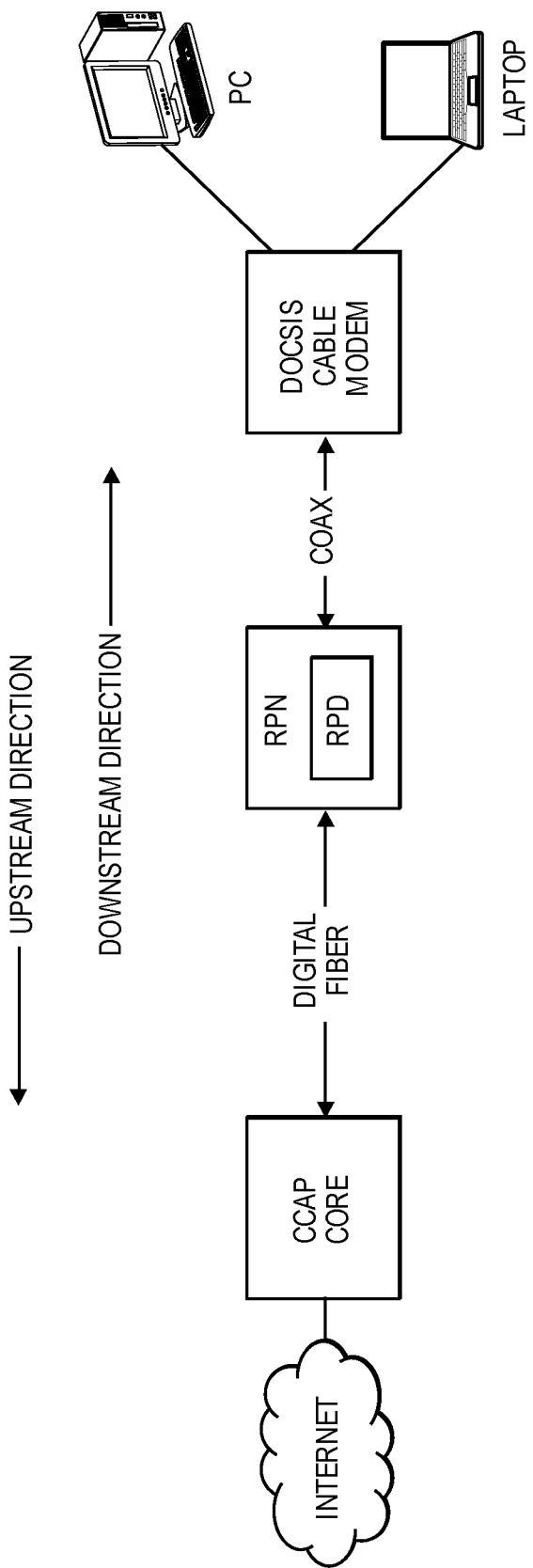
FIG. 17 is a block diagram of a CCAP platform which includes an RPD situated inside an RPN in accordance with the MHAv2 specifications of the prior art.

On the other hand, if the updated software was found not to work sufficiently well with the canary service group, as shown in FIG. 15-16, the canary service group can be rolled back to the old protection group that's running the original software version.

The canary service group feature allows a software update to be tested on a single service group on a production system. Using the canary service group feature can provide greater confidence in the stability of a software upgrade while limiting any downtime to just the canary service group.

FURTHER EMBODIMENTS

Figure 18:
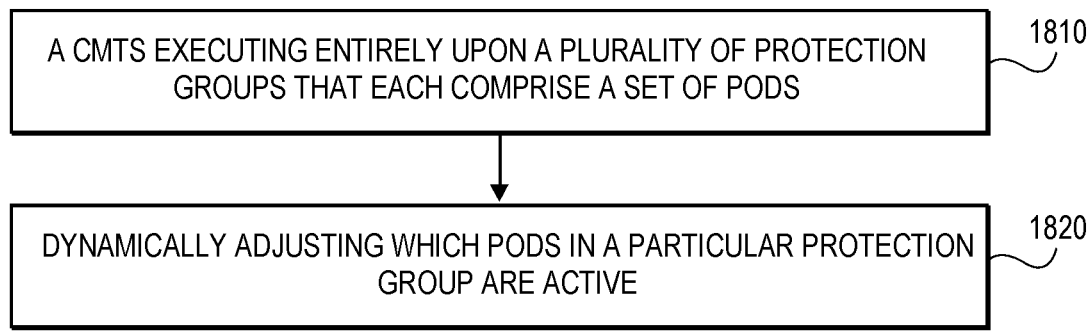
FIG. 18 is a flowchart illustrating the steps of a process for ensuring the high availability of a Cable Modem Termination System (CMTS) in accordance with an embodiment of the invention.

FIG. 18 is a flowchart illustrating the steps of a process for ensuring the high availability of a Cable Modem Termination System (CMTS) in accordance with an embodiment of the invention. In step 1810, a CMTS executes entirely upon a plurality of protection groups (PG) that each comprise a set of pods. In step 1820, the particular pods in any protection group (PG) on which the CMTS executes is dynamically adjusted.

Figure 19:
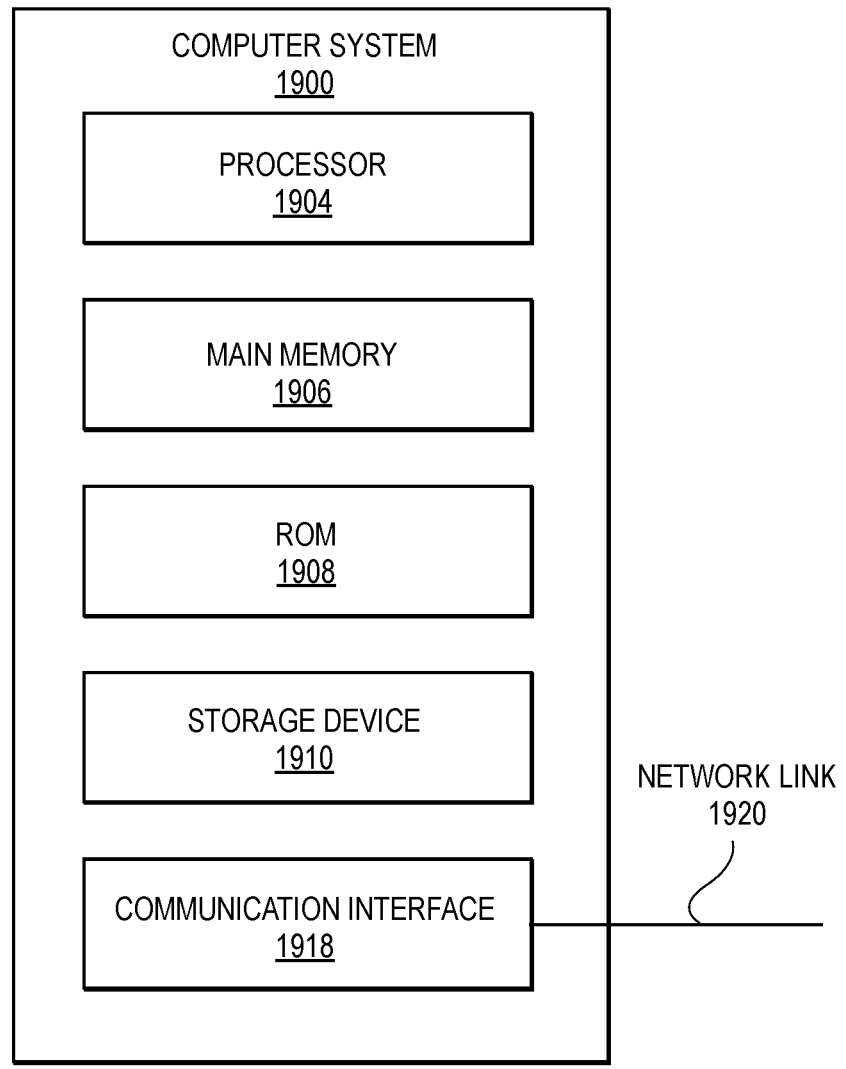
FIG. 19 is a block diagram that illustrates a computer system which may be used to perform the process of FIG. 18 or implement, in whole or in part, an embodiment of the invention.

FIG. 19 is a block diagram that illustrates a computer system 1900 which may be used to perform the process of FIG. 18 or implement, in whole or in part, an embodiment of the invention. In an embodiment, computer system 1900 includes processor 1904, main memory 1906, ROM 1908, storage device 1910, communication interface 1918, and communications bus 1930. Computer system 1900 includes at least one processor 1904 for processing information. Computer system 1900 also includes a main memory 1906, such as a random access memory (RAM) or other dynamic storage device, for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device for storing static information and instructions for processor 1904. A storage device 1910, such as a magnetic disk or optical disk, is provided for storing information and instructions.

Embodiments of the invention are related to the use of computer system 1900 for implementing the techniques described herein. According to one embodiment of the invention, those techniques are performed by computer system 1900 in response to processor 1904 executing one or more sequences of one or more instructions contained in main memory 1906. Such instructions may be read into main memory 1906 from another machine-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 1904 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a network link 1920 to computer system 1900.

Communication interface 1918 provides a two-way data communication coupling to a network link 1920 that is connected to a local network. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links or optical links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through a network to one or more other computer systems.

Computer system 1900 can send messages and receive data, including program code, through the network(s), network link 1920 and communication interface 1918. For example, a server might transmit a requested code for an application program through the Internet, a local ISP, a local network, subsequently to communication interface 1918. The received code may be executed by processor 1904 as it is received, and/or stored in storage device 1910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for ensuring the high availability of a Cable Modem Termination System (CMTS), which when executed, cause:
    the Cable Modem Termination System (CMTS) providing high speed data services to one or more remote physical devices (RPDs), wherein said Cable Modem Termination System (CMTS) executes entirely upon a plurality of protection groups, and wherein each of the plurality of protection groups consists of a plurality of pods; and
    dynamically adjusting which pods in a particular protection group are active.

2. The one or more non-transitory computer-readable storage mediums of claim 1, wherein the dynamic adjustment is made in response to determining that the particular protection group is experiencing a failure.

3. The one or more non-transitory computer-readable storage mediums of claim 1, wherein the dynamic adjustment is made in response to notification received from a high availability agent that monitors entities within a particular pod of the particular protection group to identify whether any entities within the particular pod have become nonresponsive.

4. The one or more non-transitory computer-readable storage mediums of claim 1, wherein the plurality of protection groups each provide service for a different set of cable subscribers, and wherein membership in the set of cable subscribers serviced by each protection group is based on limiting a failure domain of the cable subscribers.

5. The one or more non-transitory computer-readable storage mediums of claim 1, wherein the plurality of protection groups each provide service for a different set of cable subscribers, and wherein membership in the set of cable subscribers serviced by each protection group is based on a tier of cable service.

6. The one or more non-transitory computer-readable storage mediums of claim 1, wherein the plurality of protection groups each provide service for a different set of cable subscribers, and wherein membership in the set of cable subscribers serviced by each protection group is based a set of cable services to which cable subscribers are obligated to receive.

7. The one or more non-transitory computer-readable storage mediums of claim 1, wherein the plurality of protection groups each provide service for a set of service groups serviced by the CMTS.

8. The one or more non-transitory computer-readable storage mediums of claim 1, wherein dynamically adjusting further comprises:
selecting a particular service group from a plurality of service groups serviced by the CMTS; and
upgrading software associated with supporting the particular service group without upgrading the software associated with supporting the remainder of the plurality of service groups serviced by the CMTS.

9. An apparatus for ensuring the high availability of a Cable Modem Termination System (CMTS), comprising:
one or more processors; and
one or more non-transitory computer-readable storage mediums storing one or more sequences of instructions, which when executed, cause:
the Cable Modem Termination System (CMTS) providing high speed data services to one or more remote physical devices (RPDs), wherein said Cable Modem Termination System (CMTS) executes entirely upon a plurality of protection groups, and wherein each of the plurality of protection groups consists of a plurality of pods; and
dynamically adjusting which pods in a particular protection group are active.

10. The apparatus of claim 9, wherein the dynamic adjustment is made in response to determining that the particular protection group is experiencing a failure.

11. The apparatus of claim 9, wherein the dynamic adjustment is made in response to notification received from a high availability agent that monitors entities within a particular pod of the particular protection group to identify whether any entities within the particular pod have become nonresponsive.

12. The apparatus of claim 9, wherein the plurality of protection groups each provide service for a different set of cable subscribers, and wherein membership in the set of cable subscribers serviced by each protection group is based on limiting a failure domain of the cable subscribers.

13. The apparatus of claim 9, wherein the plurality of protection groups each provide service for a different set of cable subscribers, and wherein membership in the set of cable subscribers serviced by each protection group is based on a tier of cable service.

14. The apparatus of claim 9, wherein the plurality of protection groups each provide service for a different set of cable subscribers, and wherein membership in the set of cable subscribers serviced by each protection group is based a set of cable services to which cable subscribers are obligated to receive.

15. The apparatus of claim 9, wherein the plurality of protection groups each provide service for a set of service groups serviced by the CMTS.

16. The apparatus of claim 9, wherein dynamically adjusting further comprises:
selecting a particular service group from a plurality of service groups serviced by the CMTS; and
upgrading software associated with supporting the particular service group without upgrading the software associated with supporting the remainder of the plurality of service groups serviced by the CMTS.

17. A method for ensuring the high availability of a Cable Modem Termination System (CMTS), comprising:
the Cable Modem Termination System (CMTS) providing high speed data services to one or more remote physical devices (RPDs), wherein said Cable Modem Termination System (CMTS) executes entirely upon a plurality of protection groups, and wherein each of the plurality of protection groups consists of a plurality of pods; and
dynamically adjusting which pods in a particular protection group are active.

18. The method of claim 17, wherein the dynamic adjustment is made in response to determining that the particular protection group is experiencing a failure.

19. The method of claim 17, wherein the dynamic adjustment is made in response to notification received from a high availability agent that monitors entities within a particular pod of the particular protection group to identify whether any entities within the particular pod have become nonresponsive.

20. The method of claim 17, wherein the plurality of protection groups each provide service for a different set of cable subscribers, and wherein membership in the set of cable subscribers serviced by each protection group is based on limiting a failure domain of the cable subscribers.

21. The method of claim 17, wherein the plurality of protection groups each provide service for a different set of cable subscribers, and wherein membership in the set of cable subscribers serviced by each protection group is based on a tier of cable service.

22. The method of claim 17, wherein the plurality of protection groups each provide service for a different set of cable subscribers, and wherein membership in the set of cable subscribers serviced by each protection group is based a set of cable services to which cable subscribers are obligated to receive.

23. The method of claim 17, wherein the plurality of protection groups each provide service for a set of service groups serviced by the CMTS.

24. The method of claim 17, wherein dynamically adjusting further comprises:
selecting a particular service group from a plurality of service groups serviced by the CMTS; and
upgrading software associated with supporting the particular service group without upgrading the software associated with supporting the remainder of the plurality of service groups serviced by the CMTS.

\* \* \* \* \*